Dec. 3, 1968   L. W. GATES ET AL   3,414,115
AUTOMATIC SPRING TENSIONING OF CONVEYOR BELT
Filed March 27, 1967   2 Sheets-Sheet 1
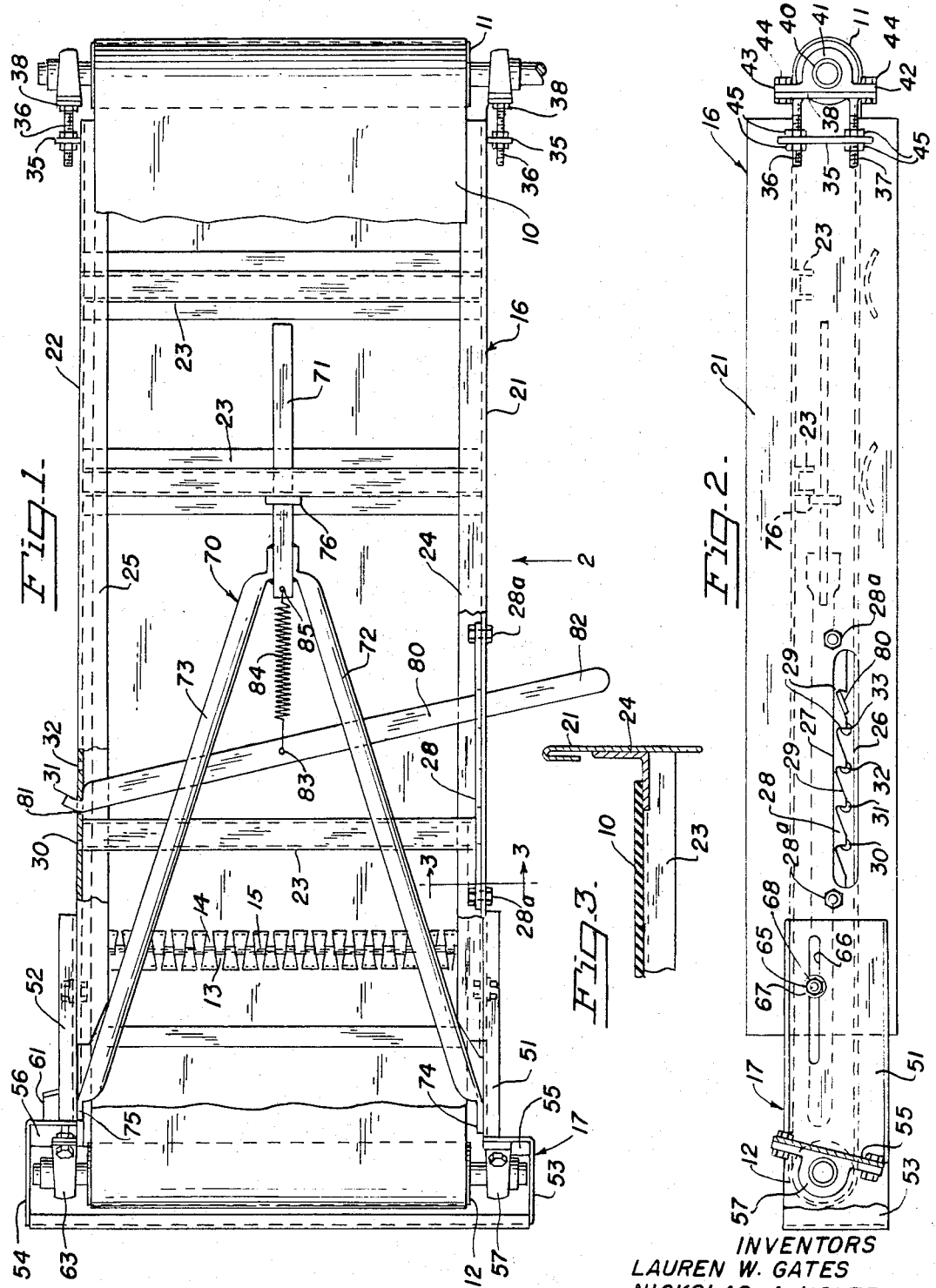
INVENTORS
LAUREN W. GATES
NICKOLAS A. HOLTZ
BY
Owen, Wickersham & Erickson
ATTORNEYS

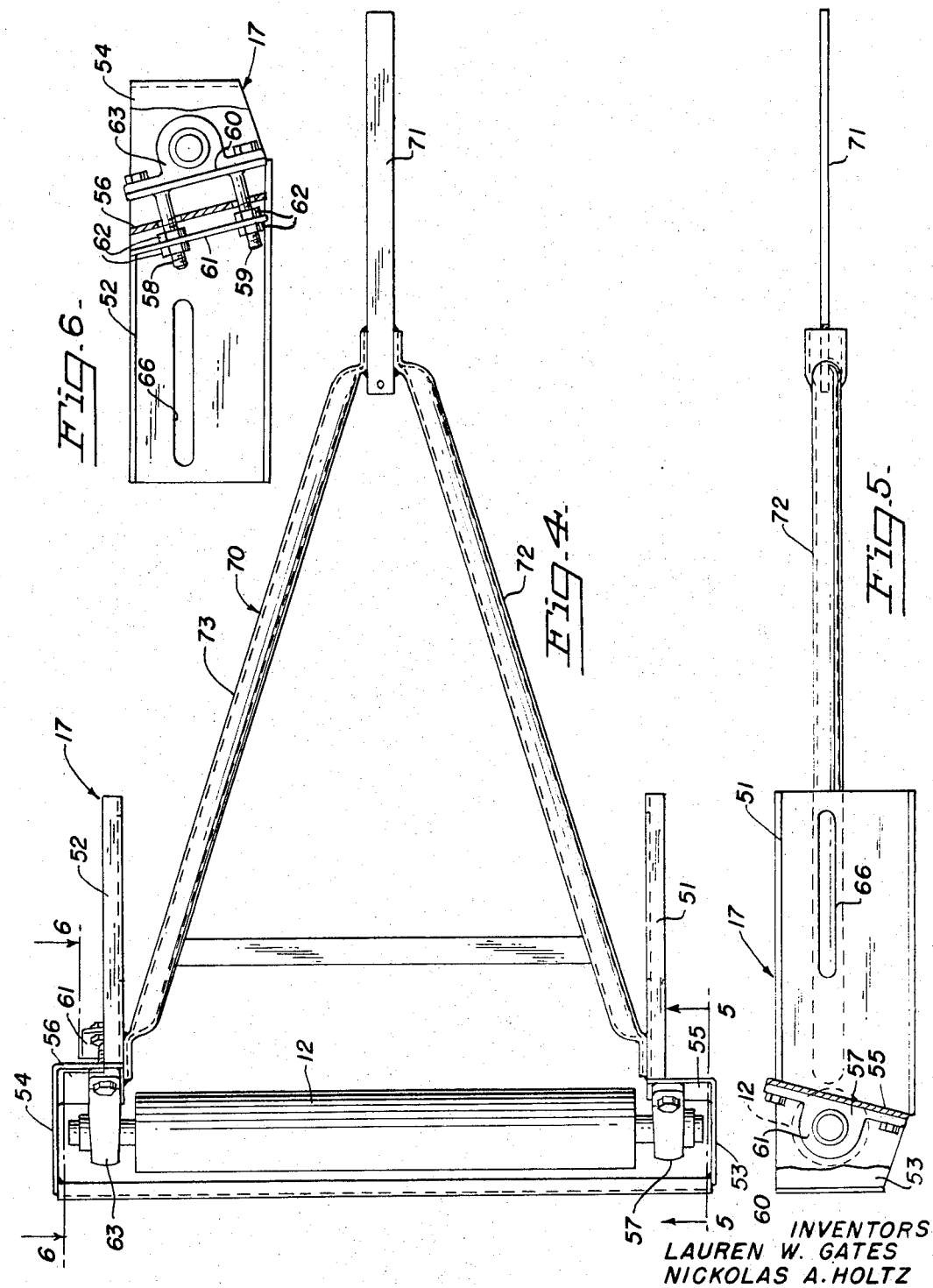

United States Patent Office 3,414,115
Patented Dec. 3, 1968

3,414,115
AUTOMATIC SPRING TENSIONING OF
CONVEYOR BELT
Lauren W. Gates, Stockton, and Nickolas A. Holtz, Sacramento, Calif., assignors to The Regents of the University of California, Berkeley, Calif.
Filed Mar. 27, 1967, Ser. No. 626,206
8 Claims. (Cl. 198—208)

ABSTRACT OF THE DISCLOSURE

A belt conveyor is provided that has a main frame with two side panels rigidly joined by cross members and, a first pulley at one end. An auxiliary frame at the other end of said main frame has a second pulley and has side panels and a Y-frame structure with the two extremities of its branches secured to the two side panels of the auxiliary frame and meeting at a central stem extending lengthwise of the conveyor centrally between the side panels of the main frame. The auxiliary frame is guided for movement in line with and relative to the main frame, and the conveyor belt is supported by the pulleys. A bar extends generally laterally across the main frame between the stem and the second pulley, and a spring joins the stem to the bar midway between the side panels of the main frame.

Preferably, one side panel of the main frame has an elongated lengthwise-extending slot with ratchet teeth along one edge, and the other side panel of the main frame has a series of spaced openings opposite the slot. The bar has one end engageable in an opening of this series and the other end engaging in said ratchet and extending beyond to provide a handle.

Each pulley is preferably supported by a bearing, which is supported by a holding means enabling adjustment for belt training. The bearing holding means comprises a bracket on the frame, a plate having a pair of threaded studs extending through openings in the bracket, nuts on each stud on each side of the bracket, and a flanged U-shaped member secured to the plate.

This invention relates to improvements in belt conveyor systems and particularly to a system for evenly tensing the belt, so that belt loads are not exceeded and so that the lacing will not be pulled out of the belt.

While this invention can be applied to endless conveyor belts with good results, especially as to tensioning, it is particularly advantageous for conveyor belts in which the ends are secured together by lacing, for, by providing an even pull on the belt, this invention prevents damage to the lacing. Belts are affected by all atmospheric conditions, and when belt conveyor systems are used outdoors, as in agricultural machinery such as tomato harvesters, belts tend to elongate or contract, according to the weather and climate conditions. In prior art systems where nothing was able to give, belts have been damaged, by being parted or ruptured or having the lacing broken or pulled out. An important object of the present invention is to solve this problem by exerting a constant tension load on the belt, just the right amount to do the job, and enabling the tension to be maintained substantially automatically.

Another difficulty with such belts has been that proper maintenance of the belt has required frequent adjustments, repeated tightening or loosening, with accompanying movement of its pulleys to get the proper tension. An object of this invention is to retain the correct tension automatically without having to resort to frequent manual adjustment.

Even with this invention, belts are likely to change their lengths gradually, becoming permanently more slack or shrinking, and occasionally major adjustments are needed; hence another object of the invention is to provide a simple adjustment structure, operable for making changes within a matter of seconds.

Briefly, the invention provides a pair of conveyor frames, each having side panels. One frame is a main frame, and its two side panels are rigidly joined by cross members; one of its side panels has an elongated lengthwise-extending slot with ratchet teeth mounted along one edge; its other side panel has a series of spaced openings opposite that slot. The main frame also has at one end a first pulley-bearing holding means, which is adjustable for belt training. A second pulley-bearing holding means, similarly adjustable, is secured to the other (auxiliary) frame at the opposite end of the main frame. This auxiliary frame is made movable relative to the main frame for lengthening and shortening the length between pulleys; its two side panels are joined by a symmertical Y-frame structure in which the two extremities of the branches of the Y are secured to the two side panels and are connected by the branches to the stem, which is located centrally between the side panels of the main frame. An adjustment bar extends through the aforementioned slot and one end is adapted to fit into any opening of that series of openings in the side panel opposite the slot; the other end of the bar provides a handle and a portion to fit into any one of the ratchet teeth. This adjustment bar is secured to the Y frame by a spring. When the bar is once set for proper tension of the belt that goes around the two pulleys, the spring will maintain that tension over a long period of time and accommodate most changes in temperature and humidity. When long-range adjustments are needed, the bar is readily moved from one ratchet tooth to another, or, at times, its end is moved from one opening to another to get still larger adjustments. The belt is put around the pulleys in the normal way and is attached together by suitable lacing. The cross-frame members, the Y-frame, and the adjustment bar all lie between the two reaches of the belt.

Other objects, advantages and features of the invention will appear from the following description of a preferred embodiment thereof.

In the drawings:

FIG. 1 is a top plan view of a conveyor system embodying the principles of the present invention, with the top reach of the belt broken away to disclose the frame parts that would otherwise be hidden.

FIG. 2 is a view in side elevation looking at FIG. 1 along the arrow 2.

FIG. 3 is a view in section taken along the line 3—3 in FIG. 1.

FIG. 4 is an enlarged top plan view of the auxiliary frame.

FIG. 5 is a view in side elevation and in section of the auxiliary frame taken along the line 5—5 in FIG. 4.

FIG. 6 is a fragmentary view in section taken along the line 6—6 in FIG. 4.

The illustrated conveyor, given by way of example of the principles of this invention, comprises a belt 10 supported by two pulleys 11 and 12 and having its ends 13 and 14 joined by lacing 15. The pulley 11 is carried by a main frame 16, and the pulley 12 is carried by an auxiliary frame 17, which is mounted movable relatively to the main frame 16 along the lengthwise axis thereof.

The main frame 16 comprises two side panels 21 and 22 joined together by a series of crosswise extending members 23 which are welded to the side panels 21 and 22, and two angle irons 24 and 25 are bolted to the respective side panels 21 and 22 in order to guide the belt 10. The side panel 21 has an elongated slot 26, along one edge of which, preferably the top edge 27, a ratchet bar 28 is secured, as by bolts 28a, to the side panel 21. The ratchet bar 28 provides a series of teeth 29 used in making manual adjustments. On the opposite side panel 22, directly opposite the slot 26 is a series of adjustment openings 30, 31, 32 and 33.

At one end of the main frame 16 is provided a structure for adjustably mounting the pulley 11. A bracket 35 is welded to each side frame panel 21, 22 and it has openings to receive studs 36 and 37 that are welded to a plate 38. A bearing 40 which supports the pulley 11 is held by a U-shaped support member 41 having flanges 42 and 43 that are held to the plate 38 by bolts 44. Nuts 45 are threaded to the studs 36 and 37 on opposite sides of the bracket 35, so that both studs 36 and 37 can be independently adjusted. This structure enables sufficient adjustment of the pulley 11 to train the belt 10 properly at that end. Such training is usually necessary upon initial installation and is rarely necessary again thereafter, though adjustment may be made easily if it does become necessary.

The auxiliary frame 17 comprises two side panels 51 and 52 with outset end portions 53 and 54 joined to the panels 51 and 52 by walls 55 and 56. The portion 53 is shorter than the portion 54, and a U-shaped bearing support member 57 is bolted directly to the portion 55. Pulley adjustment means is provided on the other side of the auxiliary frame 17, the wall 56 playing no part in this, having oversize holes therethrough for studs 58 and 59 to extend from a plate 60 to a bracket 61 that is welded to the panel 52. There are adjustment nuts 62 and another U-shaped bearing support 63. The walls 55 and 56 may be, but need not be, set at an angle to the vertical as is the bracket 61.

The two side panels 51 and 52 are slightly further apart than the side panels 21 and 22 of the main frame 16 and are adapted to slide relatively to them by means of support bolts 65 secured to the side panels 21 and 22 of the main frame 16 and a slot 66 provided in each side panel 51 and 52 of the auxiliary frame 17. A washer 67 and a spacer 68 on the bolt 65, of greater thickness than the thickness of the panel 51 or 52, between the panel 21, 22 and the washer 67 enable relative fore-and-aft movement of the frames 17 and 16.

The two side panels 51 and 52 of the auxiliary frame 17 are joined together by being welded to a symmetrical Y-frame portion 70 made up of a stem 71 and branches 72 and 73 welded together. The outer ends 74 and 75 of the branches 72 and 73 are welded to the side panels 51 and 52. The main stem 71 lies centrally between the side panels 21 and 22 of the main frame 16. Since the structure is all welded together, the auxiliary frame 17 is substantially integral.

The stem 71 of the Y-portion 70 is vertically and laterally guided by a close fitting opening in a lug 76, which is welded to one cross member 23 of the frame 16. This arrangement enables movement of the frame 70 within the frame 20 in such a manner as to loosen or tighten the belt 10 without causing any change in the relative angle of the pulley 12 and resultant disturbance of the belt training.

An adjustment and anchor bar 80 has a projection 81 on one end adapted to engage any one of the openings 30, 31, 32, 33 in the side panel 22. The bar 80 may be flattened, at least for a portion at the other end, the better to adapt it to engage the ratchet teeth 29 in the slot 26 and to extend therebeyond to provide a handle 82 for moving the bar 80 from one ratchet tooth 29 to another or for withdrawing its end 81 from one opening 30 and moving it into another opening 31. Centrally between the two side panels 21 and 22 a spring anchor 83 is provided, to which is attached one end of a spring 84, and the other end of the spring 84 is attached to an anchor 85 on the stem 71 of the Y-frame portion 70. By this means, once the adjustment bar 80 is located properly to give a desired tension upon the installed belt 10, that tension is maintained by the spring 84.

In operation, the belt 10 is installed in the normal manner and secured by its lacing 15. The Y-frame portion 70 and the member 23 lie between the two reaches of the belt 10, as does the adjustment bar 80. The adjustment bar 80 has its end 81 located in a proper opening 30 or 31 or 32 or 33, and the bar 80 is then set in the proper ratchet tooth 29 to give the desired tension on the belt 10. The belt 10 may then be operated so that its training may be studied. Training is adjusted at one end of each pulley 11 and 12 by means of the studs 36, 37, and 58, 59, and nuts 45 and 62, shown, until the belt 10 is properly trained. Then adjustment of the bar 80 is rechecked; if it is satisfactory, it is left; if not, the bar 80 is moved to another ratchet opening 29. During normal working, the tension spring 84 holds the two frames 16 and 17 relatively together and provides the right amount of tension on the belt 10. Should the belt 10 permanently stretch or shrink, the adjustment bar 80 is moved to another ratchet opening 29, or its end 81 may be moved to another opening, if that is called for. The tension spring 84 takes care of the short-term variations automatically, and the bar adjustment takes care of the larger adjustments.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. A belt conveyor including in combination
 a main frame having two side panels rigidly joined by cross members,
 a first pulley supported at one end of said main frame,
 an auxiliary frame at the other end of said main frame from said first pulley and having a second pulley supported thereby, said auxiliary frame having side panels and a Y-frame structure having the two extremities of its branches secured to the two side panels of said auxiliary frame and meeting at a central stem extending lengthwise of said conveyor centrally between the side panels of said main frame,
 a conveyor belt supported by said pulleys,
 means for guiding said auxiliary frame for movement in line with and relative to said main frame,
 rigid means extending generally laterally across said main frame between said stem and said second pulley, and
 spring means joining the stem of said Y-frame to said rigid means midway between said side panels of said main frame, so that said spring means is in tension which is increased by movement of said auxiliary frame toward said first pulley.

2. The belt conveyor of claim 1 wherein one said side panel of said main frame has an elongated lengthwise extending slot with ratchet teeth mounted along one edge thereof, the other said side panel of said main frame having a series of spaced openings opposite said slot, said rigid means comprising a bar having one end engageable in a said opening and the other end providing for engagement in said ratchet and extending beyond to provide a handle.

3. The conveyor of claim 1 wherein each pulley is supported by a bearing, and said bearing is supported by bearing holding means for holding said bearing rigidly with respect to said main frame and having independent adjustment means to aid in belt training.

4. The conveyor of claim 3 wherein each said bearing holding means comprises a bracket on said frame, a plate having a pair of threaded studs extending through openings in said bracket, nuts on each stud on each side of said bracket, and a flanged U-shaped member secured to said plate.

5. A belt conveyor of the type employing a belt with its ends joined by lacing and wherein it is desired to put an even pressure on the belt and its lacing, including in combination
- a main frame comprising two side panels welded to cross members, one said side panel having an elongated lengthwise-extending slot with ratchet teeth mounted along one edge thereof, the other said side panel having a series of spaced openings opposite said slot,
- a first pulley held at one end of said main frame,
- an auxiliary frame at the other end of said main frame from said first pulley and having a second pulley, said auxiliary frame having side panels and a Y-frame structure having the two extremities of its branches welded to the two side panels of said auxiliary frame and meeting at and welded to a central stem extending lengthwise of said conveyor centrally between the side panels of said main frame, said belt being looped around said first and second pulley means to provide upper and lower reaches and with its ends laced together, said cross members and Y-frame lying between the upper and lower reaches of the belt,
- means for guiding said auxiliary frame for movement in line with and relative to said main frame,
- an adjustment bar between said reaches extending generally laterally across said main frame between said stem and said second pulley and having one end engageable in a said opening in said side panel having the series of openings and the other end providing for engagement in said ratchet of the other said side panel of said main frame and extending beyond to provide a handle, and
- spring means joining the stem of said Y-frame to said adjustment bar midway between said side panels of said main frame.

6. A belt conveyor of the type wherein a belt's ends are joined by lacing and wherein it is desired to put an even pressure on the belt and its lacing, including in combination
- a main frame comprising two side panels rigidly joined by cross members, one said side panel having an elongated lengthwise extending slot with ratchet teeth mounted along one edge thereof, the other said side panel having a series of spaced openings opposite said slot,
- first pulley bearing holding means at one end of one said side panel,
- a first bearing held by said first holding means, rigidly with respect to said main frame and adjustably to aid in belt training,
- a first pulley held in said first bearing,
- an auxiliary frame at the other end of said main frame from said first pulley and having second pulley bearing holding means, with a second bearing and a second pulley therein, said second holding means being adjustable to aid in belt training and rigidly mounted to said auxiliary frame, said auxiliary frame having side panels,
- a Y-frame structure having the two extremities of its branches secured to the two side panels of said auxiliary frame and meeting at a central stem extending lengthwise of said conveyor centrally between the side panels of said main frame,
- means for guiding said auxiliary frame for movement in line with and relative to said main frame,
- an adjustment bar extending generally laterally across said main frame and having one end engageable in a said opening in said side panel having the series of openings and the other end providing for engagement in said ratchet of the other said side panel of said main frame and extending beyond to provide a handle,
- spring means joining the stem of said Y-frame to said adjustment bar midway between said side panels of said main frame, and
- said belt looped around said first and second pulley means and with its ends laced together.

7. The belt conveyor of claim 1 wherein said branches of said Y-frame meet at a sharp acute angle such that the length of each said branch is greater than the width of said main frame.

8. The belt conveyor of claim 7 wherein said branches meet closely adjacent said means for guiding.

References Cited

UNITED STATES PATENTS

| 156,636 | 11/1874 | Holt | 308—33 |
| 252,081 | 1/1882 | Davis | 198—208 |
| 452,191 | 5/1891 | Oliver | 198—208 |
| 469,293 | 2/1892 | Carver | 198—208 |

FOREIGN PATENTS

| 1,013,441 | 7/1952 | France. |

EDWARD A. SROKA, *Primary Examiner.*